United States Patent [19]

McLean

[11] Patent Number: 4,638,634
[45] Date of Patent: Jan. 27, 1987

[54] ENGINE POWERED AUXILIARY AIR SUPPLY SYSTEM

[75] Inventor: John R. McLean, San Pedro, Calif.

[73] Assignee: The Garrett Corporation, Los Angeles, Calif.

[21] Appl. No.: 784,133

[22] Filed: Oct. 4, 1985

[51] Int. Cl.$^4$ .............................................. F02B 33/44
[52] U.S. Cl. ...................................... 60/612; 60/602; 417/380
[58] Field of Search .......................... 60/602, 605, 612; 417/380

[56] References Cited

U.S. PATENT DOCUMENTS 3,204,859  9/1965  Crooks ........................... 417/380 X
4,169,354 10/1979  Woollenweber .............. 417/380 X
4,496,291  1/1985  Grimmer .......................... 60/612 X

FOREIGN PATENT DOCUMENTS 190518 11/1983 Japan ....................................... 60/612

Primary Examiner—Stephen F. Husar
Attorney, Agent, or Firm—J. Henry Muetterties; Albert J. Miller

[57] ABSTRACT

An auxiliary air supply system which is utilized in association with an engine including at least one exhaust gas driven turbocharger for compression of ambient air. The system further includes low and high pressure auxiliary air compressor for further compression of the compressed air discharged from the turbocharger. The amount of power supplied to each compressor is regulated by a control system responsive to an engine parameter and the auxiliary air pressure.

21 Claims, 3 Drawing Figures

ENGINE POWERED AUXILIARY AIR SUPPLY SYSTEM

This system relates to internal combustion engines and to exhaust gas turbines and compressor systems and more particularly with a compound turbocharger system for providing an excess quantity of compressed air to satisfy the requirements of an auxiliary compressed air utilizing device.

For years it has been recognized that the power and efficiency of an internal combustion engine can be substantially improved by the addition of a turbocharger to boost the intake manifold pressure. Turbochargers include an exhaust gas driven turbine which is utilized to simultaneously rotate an impeller-type compressor to compress air for supply to the engine.

While turbochargers of the type described above are excellent for improving the power and efficiency of an internal combustion engine, special situations arise which require the use of an auxiliary compressed air device. In such cases a problem arises in that the turbocharger compression is responsive to engine speed and load. Depending upon the requirements of the auxiliary system, the engine compressor may not deliver the necessary pressure.

Several attempts have been made to achieve flexibility in specialized turocharger applications by arranging a plural or compound turbocharged system which may be altered to suit the particular operating conditions of engine to which the system is coupled. U.S. Pat. No. 4,169,354 discloses a turbocharged system which supplies excess air to a bulk material pneumatic conveyor of the type used in tractor-trailer vehicles customarily powered by diesel engines.

The present invention is an advancement in the art by providing a turbocharged system in which the system is able to supply the requisite amount of compressed air to the engine as well as to provide a source of compressed, auxiliary air to run an auxiliary air system such as an air-cycle air conditioning system of the vehicle in which it is installed.

The present invention comprises an exhaust gas driven turbocharger associated with each engine exhaust manifold bank. Compressed air from the engine turbocharger is supplied to the engine and to a low pressure compressor and to a high pressure compressor in series before being supplied to the auxiliary air system. Exhaust gases discharged from the engine are directed to the turbocharger and a turbine associated with each of the low and high pressure compressors. A valve means, located between each engine exhaust manifold bank and the turbocharger, regulates the exhaust flow to the turbines associated with the low and high pressure compressors.

It is an object of this invention to provide a turbocharged engine system which can supply the engine and an auxiliary air system with the requisite amount of compressed air.

It is another object of this invention to provide an auxiliary air supply system which is coupled by engine oil pressure and auxiliary air pressure.

It is another object of this invention to supply compressed air, in excess of engine requirement, to an auxiliary air system.

BRIEF DESCRIPTION OF THE DRAWINGS

FIG. 3 is a schematic diagram of an alternative embodiment of the auxiliary air system.

DETAILED DESCRIPTION OF THE INVENTION

Figure 1:
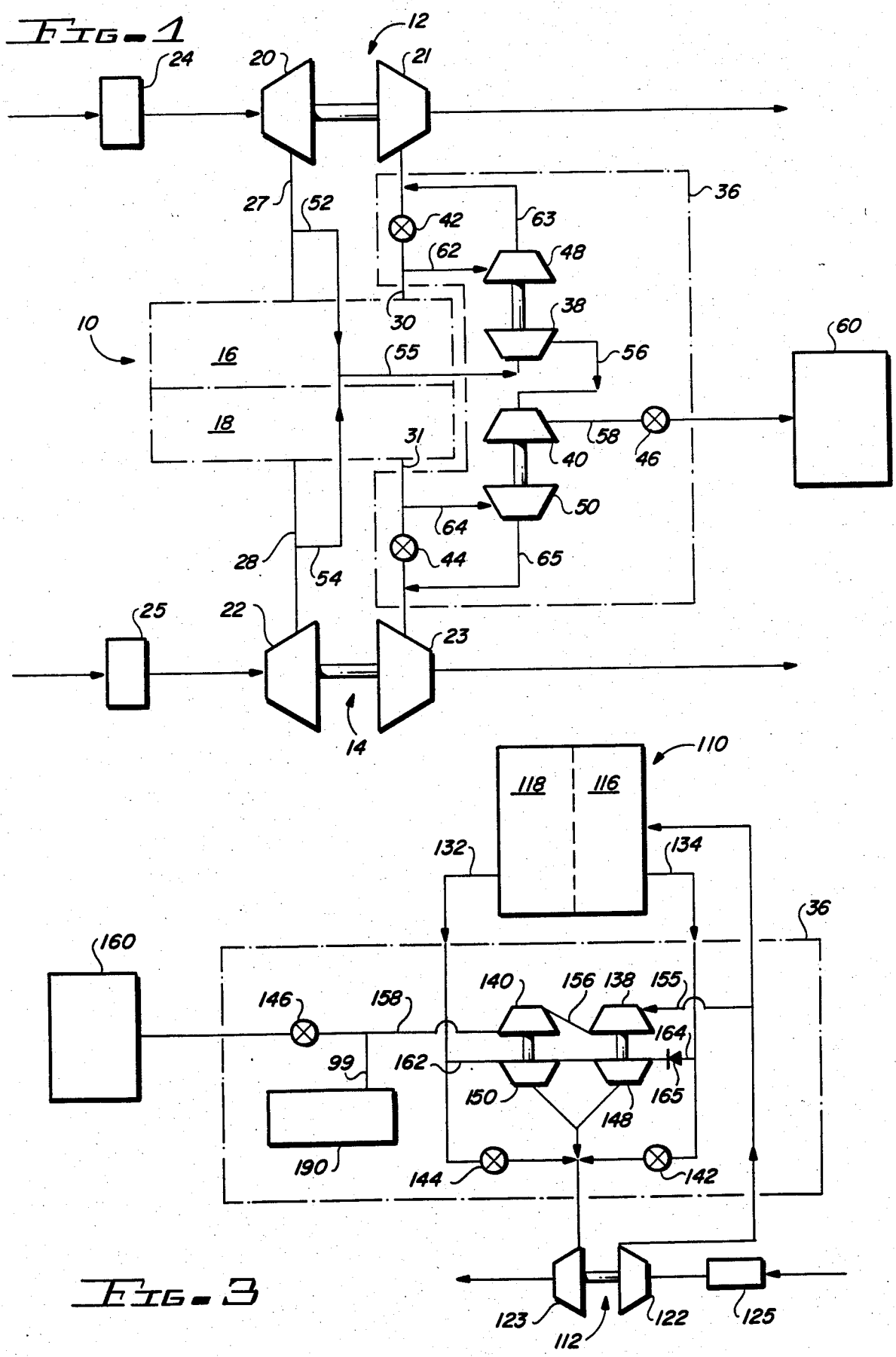
FIG. 1 is a schematic diagram of the auxiliary-air supply system of the present invention.

The present invention as shown in FIG. 1 comprises an engine 10 having an engine turbocharger 12 and 14 associated with each engine exhaust manifold bank 16 and 18 respectively. Engine turbochargers and their operation are well known and are available from The Garrett Corporation, Los Angeles, California. Ambient air is drawn into the compressor portion 20 and 22 of each turbocharger after having passed through a suitable air filter 24 and 25 associated with each compressor. Compressed air exiting the compressors is supplied via lines 27 and 28 to the engine inlet manifold, then into the cylinders whereupon it is mixed and combined with engine fuel and exhausted via exhaust conduits 30 and 31. The exhaust gases rotatably drive the turbine wheel associated with each turbocharger which in turn rotatably drives the compressor impeller via a connecting shaft.

DETAILED DESCRIPTION OF THE PREFERRED EMBODIMENT

The auxiliary air supply system of the present invention is designated as 36 and comprises a low pressure (LP) auxiliary air compressor 38 and a high pressure (HP) auxiliary air compressor 40, control valves 42 and 44, shut-off valve 46 and turbines 48 and 50 associated with the LP auxiliary air compressor 38 and HP auxiliary air compressor 40.

Compressed air from each engine turbocharger compressor 20 and 22 is bled off via lines 52 and 54 and delivered to the LP auxiliary air compressor 38 via line 55. Compressed air from the LP auxiliary air compressor 38 is fed to the inlet of the HP auxiliary air compressor 40 via line 56. The output of the HP auxiliary air compressor 40 is fed via line 58 to the auxiliary air system 60. Auxiliary air system 60 can be a number of items, but is generally envisioned to be an air conditioning unit or support air system for a specialty vehicle. Shut-off valve 46 opens and closes line 58 to control the flow of high pressure air into the auxiliary air system 60 as required.

Figure 2:
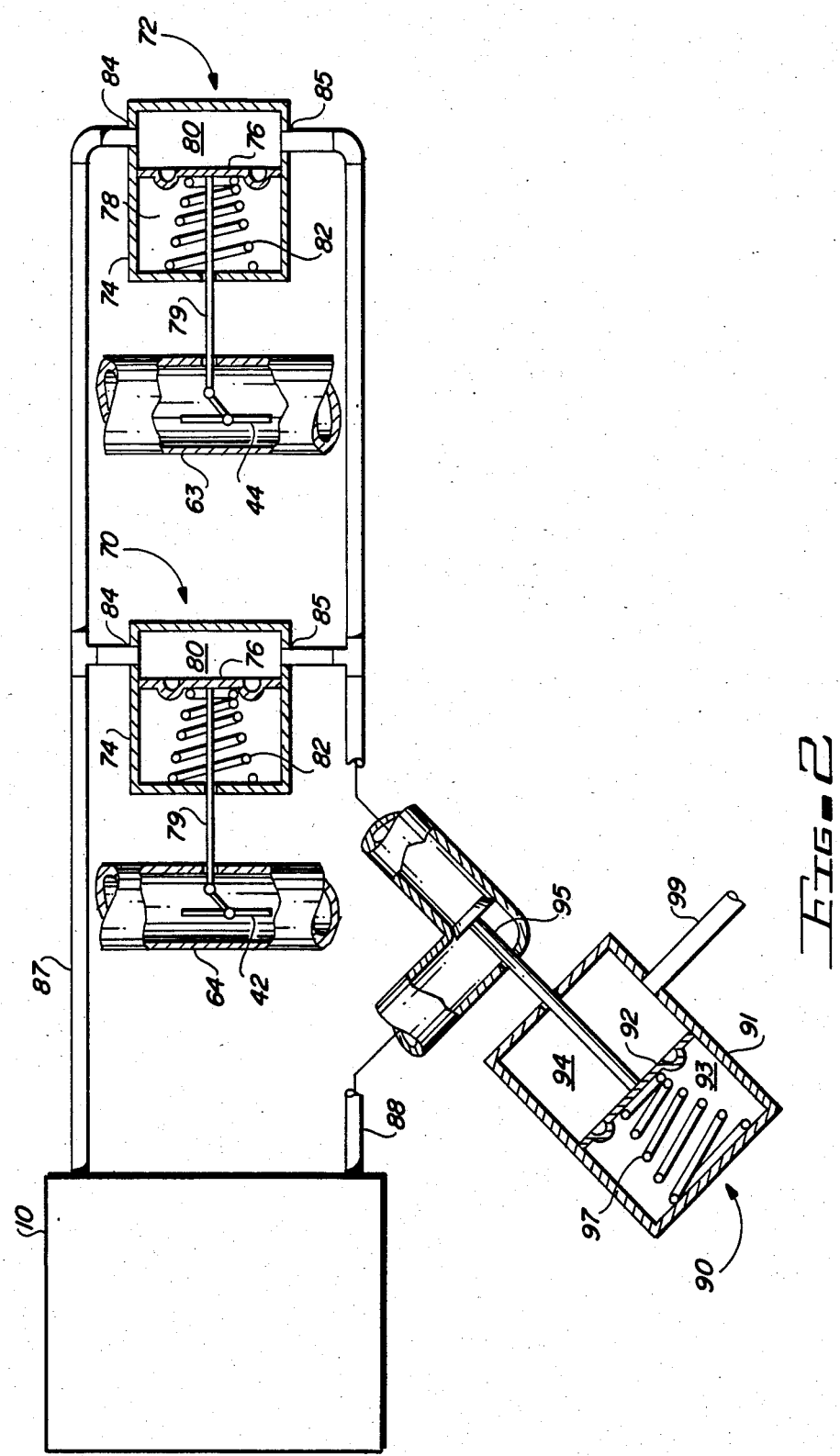
FIG. 2 is a schematic diagram of the pneumatic actuator and control system used to control the valve of the present invention.

LP and HP compressors 38 and 40 are powered by engine exhaust gas driven turbines 48 and 50, respectively. While the present invention has been tested using commercially available turbochargers as the LP and HP compressors, the scope of the inventions should not be deemed to be limited to such hardware. The amount of compression experienced by the air delivered to the LP compressor 38 via line 55 is regulated by control valve 42. Valve 42 regulates the amount of engine exhaust gases in line 30 which is bypassed to turbine 48 associated with the LP compressor 38 via line 62. Similarly, the amount of compression experienced by the air exiting the LP compressor in line 56 by the HP compressor 40 is regulated by control valve 44. Valve 44 regulates the amount of engine exhaust gases bypassed to the HP compressor via line 64. Exhaust gases exiting the turbines 48 and 50 are returned to engine exhaust lines 30 and 31 via lines 63 and 65, respectively. Exhaust gases exiting the engine turbocharger turbines 21 and 23 are exhausted to atmosphere. The control system of auxiliary air supply system 36 is shown schematically in FIG. 2. Valves 42 and 44 are "butterfly" type valves which are opened and closed by actuators 70 and 72 arranged in parallel. As shown, the actuators include a housing 74 of suitable material and a diaphragm 76 which divides the housing into two chambers 78 and 80. Within chamber 78 is a spring 82 which biases the valves (42, 44) open via actuator rods 79. Housing 74 further includes an oil inlet and outlet, 84 and 85 respectively, thus exposing chamber 80 to engine oil pressure via engine oil line 87 and return line 88. It is important that the oil inlet port 84 be smaller in area than the oil outlet port 85 as will be explained below.

Within the oil return line 88 is a control 90 which controls the oil flow back to the engine 10. Control 90 includes housing 91 and a control diaphragm 92 which divides the housing into two chambers 93 and 94. Attached to the diaphragm 92 for movement therewith is poppet valve 95 for closing off oil return line 88. Chamber 93 contains spring 97 which biases the valve into a closed position. Chamber 94 is vented to the auxiliary air supply line 58 via line 99.

During operation, at low engine power conditions, the valves 42 and 44 will be partially or fully closed in order to develop the desired auxiliary air pressure in line 58. As engine power increases, the engine turbocharger compressors 20 and 22 deliver increased pressure and the valves 42 and 44 open to reduce the compression in the LP and HP compression stages 38 and 40 by reducing the flow of exhaust gases to turbines 48 and 50.

The control system cooperates to obtain the above-described operation as follows: at low engine power conditions, oil pressure in chamber 80 will overcome the force of spring 78 and move valves 42 and 44 toward a closed position due to the oil return line 88 being closed by the force of spring 97. As valves 42 and 44 close the auxiliary air supply turbochargers increase in speed and the delivery air pressure rises. When the auxiliary air pressure reaches the desired value, the pressure in control chamber 94 will override the force of spring 97 opening poppet valve 95. Opening of poppet valve 95 relieves the pressure in actuator chamber 80 since the oil inlet port area is less than the oil outlet port area. This in turn allows spring 82 to modulate valves 42 and 44 into the control position. As engine power increases the engine turbocharger compressors deliver a greater share of the required auxiliary air pressure and valve 95 opens further to cause exhaust valves 42 and 44 to continually modulate the auxiliary air delivery pressure. In the likely event that the engine supplied oil pressure in line 87 changes with engine operating conditions, valve 95 will open or close under the combined actions of spring 97 and the pressure force in chamber 94 to maintain the required pressure in chamber 80.

FIG. 3 shows an alternative embodiment of the present invention. As shown, the alternative embodiment comprises an engine 110 and one engine turbocharger 112 in cooperation with the auxiliary air supply system 36 of the present invention.

In the alternative arrangement, a controlled quantity of compressed air from the engine turbocharger 112 is bled off and delivered to the LP auxiliary compressor 138 via line 155. Compressed air exiting the LP compressor 138 is fed into the HP compressor 140 via line 156. The output of the HP compressor 140 is fed via line 158 to the auxiliary air system 160. Shutoff valve 146 opens and closes line 158 to control the flow of high pressure air to the auxiliary air system 160 as required.

LP and HP compressors 138 and 140 are powered by engine exhaust gas driven turbines 148 and 150 respectively. Turbines 148 and 150 are flow connected to the engine 110 via engine exhaust conduits 132 and 134 and exhaust bypass lines 162 and 164. Downstream of the intersection of lines 132 and 162 is valve 144 which regulates the amount of engine exhaust gas from engine exhaust bank 118 to pass through turbines 148 and 150. Check valve 165 prevents the higher pressure exhaust in passage 162 from escaping via passage 164.

Under certain conditions, such as idle, when there is insufficient exhaust energy from engine bank 118 to provide the required auxiliary air supply pressure, valve 142 is closed to force additional exhaust flow from bank 116 to turbines 148 and 150 through passage 164 and check valve 165. Exhaust gases of turbine 150 and 148 are fed back into engine exhaust conduits 132 and 134 downstream of valves 144 and 142 for supply to engine turbocharger 112. Valves 142 and 144 and control valve 190 function in a somewhat similar manner as in the preferred embodiment.

Various modifications to the depicted and described apparatus and method will be apparent to those skilled in the art. Accordingly, the foregoing detailed description of the preferred embodiment of the invention should be considered exemplary in nature, and not as limiting to the scope and spirit of the invention as set forth in the appended claims.

I claim:

1. An auxiliary air supply system comprising:
    an engine;
    at least one exhaust driven turbocharger including a turbine and a compressor associated therewith for supply of compressed air to the engine;
    a low pressure compressor including means for powering said low pressure compressor utilizing the engine exhaust gas and flow connected to receive a portion of the compressed air exiting said engine turbocharger compressor;
    a high pressure compressor including means for powering said high pressure compressor utilizing the engine exhaust gas and flow connected to receive the compressed air exiting the low pressure compressor; and
    means for directing engine exhaust gases between said at least one engine turbocharger and said means for powering said low and high pressure compressors.

2. The auxiliary air system of claim 1 further comprising a shutoff valve downstream of the high pressure compressor.

3. The auxiliary air supply system of claim 1 wherein the low and high pressure compressors include an exhaust exhaust gas driven turbine associated with each.

4. The auxiliary air supply system of claim 1 wherein the engine includes two exhaust banks and an engine turbocharger associated with each of said engine exhaust banks.

5. The auxiliary air supply system of claim 3 wherein said means comprises:
    actuator/valve means associated with each of said low pressure compressor and said high pressure compressor for controlling the amount of engine exhaust gases to their respective turbine; and control means responsive to the pressure of the high pressure compressor for controlling each of said actuator/valve means.

6. The auxiliary air supply system of claim 5 wherein said actuator/valve means is responsive to engine oil pressure.

7. The auxiliary air supply system of claim 6 wherein said control means regulates the engine oil pressure acting on said actuator/valve means.

8. An auxiliary air supply system comprising:
at least one exhaust gas driven turbocharger for supply of compressed air to an engine;
a low pressure compressor means for compressing a portion of said compressed air discharged from said turbocharger;
a high pressure compressor means for further compressing the compressed air discharged from said low pressure compressor means;
means, associated with each of said low and high pressure compressor means, for powering said low and high pressure compressor means, said means utilizing engine produced energy; and
means for apportioning said engine produced energy between said at least one turbocharger and said means for powering said low and high pressure compressor means.

9. The auxiliary air supply system of claim 8 further comprising a shutoff valve downstream of the high pressure compressor means.

10. The auxiliary air supply system of claim 8 wherein said means for powering said low and high pressure compressor means comprises an exhaust gas driven turbine associated with each low and high pressure compressor means.

11. The auxiliary air supply system of claim 10 wherein said means for apportioning comprises:
actuator/valve means associated with each of said low and high pressure compressor means for controlling the amount of engine exhaust gases to their respective turbines; and
control means responsive to the pressure of the high pressure compressor means for controlling each of said actuator/valve means.

12. The auxiliary air supply system of claim 8 further including an auxiliary air system utilizing said compressed air exiting said high pressure compressor.

13. An auxiliary air supply system comprising:
an engine having two exhaust manifold banks;
an exhaust gas driven turbocharger associated with each engine exhaust manifold bank for supply of compressed air to the engine;
a low pressure compressor powered by an engine exhaust gas driven turbine and flow connected to receive a portion of the compressed air exiting said engine turbocharger compressors;
a high pressure compressor powered by an engine exhaust gas driven turbine and flow connected to receive compressed air from said low pressure compressor;
a shutoff valve downstream of said high pressure compressor; and
valve means for apportioning engine exhaust gas flow between said two engine turbochargers and said turbines associated with said low and high pressure compressors;

actuator means associated with each valve means for positioning said valve means.

14. The auxiliary air supply system of claim 13 wherein said actuator means are responsive to engine oil pressure.

15. The auxiliary air system of claim 14 further incuding control means responsive to said pressure exiting the high pressure compressor for regulating the engine oil pressure acting on said actuator means.

16. A method of supplying auxiliary air to an auxiliary air system comprising the steps of:
compressing ambient air in a turbocharger;
directing said compressed air to an engine and to a low pressure compressor;
further compressing a portion of said compressed air in said low pressure compressor;
still further compressing said compressed air exiting the low pressure compressor in a high pressure compressor;
supplying said compressed air exiting the high pressure compressor to an auxiliary air system; and
directing engine exhaust gases to the turbocharger and to exhaust gas driven turbines powering each of the low and high pressure compressors.

17. The method of claim 16 further including the step of regulating the amount of exhaust gases to the turbocharger and each turbine.

18. In association with an engine, a method of supplying compressed air to an auxiliary air system comprising the steps of:
directing and regulating the engine exhaust gases to an exhaust gas driven turbocharger and the turbine associated with and powering a low and high pressure compressor;
compressing ambient air in the turbocharger;
directing a portion of said compressed air to said engine and a low pressure compressor;
still further compressing said compressed air directed from said turbocharger in said low pressure compressor;
still further compressing said compressed air exiting said low pressure compressor in said high pressure compressor; and
supplying said compressed air exiting said high pressure compressor to an auxiliary air system.

19. The method according to claim 18 further comprising the step of directing the exhaust gases from the turbine to the turbocharger.

20. A method of supplying auxiliary air to an auxiliary air system comprising the steps of:
compressing ambient air in a turbocharger;
directing said compressed air to an engine and to a low pressure compressor;
further compressing a portion of said compressed air in said low pressure compressor;
still further compressing said compressed air exiting the low pressure compressor in a high pressure compressor;
supplying said compressed air exiting the high pressure compressor to an auxiliary air system; and
directing engine exhaust gases to the turbocharger and to means for powering each of the low and high pressure compressors.

21. The method of claim 20 further including the step of regulating the amount of exhaust gases to the turbocharger and the means for powering.

* * * * *